US012717569B2

(12) United States Patent
Butscher

(10) Patent No.: US 12,717,569 B2
(45) Date of Patent: Aug. 25, 2026

(54) CONTAINER-BASED SOFTWARE UPDATE FOR MULTI-VERSION SOFTWARE

(71) Applicant: SAP SE, Walldorf (DE)

(72) Inventor: Stefan Butscher, Sandhausen (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 18/530,358

(22) Filed: Dec. 6, 2023

(65) Prior Publication Data

US 2025/0190196 A1 Jun. 12, 2025

(51) Int. Cl.
*G06F 11/36* (2025.01)
*G06F 8/60* (2018.01)
*G06F 8/65* (2018.01)
*G06F 9/54* (2006.01)
*G06F 11/3668* (2025.01)
*G06F 11/3698* (2025.01)

(52) U.S. Cl.
CPC ............ *G06F 8/65* (2013.01); *G06F 11/3688* (2013.01); *G06F 11/3698* (2025.01)

(58) Field of Classification Search
CPC ......... G06F 8/65; G06F 8/71; G06D 11/3698; G06D 11/3688
See application file for complete search history.

(56) References Cited

U.S. PATENT DOCUMENTS 11,436,001 B2 * 9/2022 Masis ........................ G06F 8/65
2020/0097390 A1 * 3/2020 Gunter ................ G06F 11/3684
2024/0403024 A1 * 12/2024 Eberlein ................... G06F 8/65
2025/0110718 A1 * 4/2025 Ahn .................... G06F 11/0709

* cited by examiner

*Primary Examiner* — S. Sough
*Assistant Examiner* — Mohammad H Kabir
(74) *Attorney, Agent, or Firm* — Buckley, Maschoff & Talwalkar LLC

(57) ABSTRACT

Provided are systems and methods that facilitate the upgrade of multiple versions of a software application within a containerized environment. In one example, the method may include importing a software update of a software application into a prior version of the software application in a containerized environment, executing a test of the prior version of the software application with the software update included therein via the containerized environment and display results of the execution of the test via a user interface, modifying the prior version of the software application with the software update included therein while the prior version of the software application with the software update included therein is within the containerized environment, and delivering an instance of the modified prior version of the software application from the containerized environment to a productive environment.

16 Claims, 7 Drawing Sheets

Figure 1:
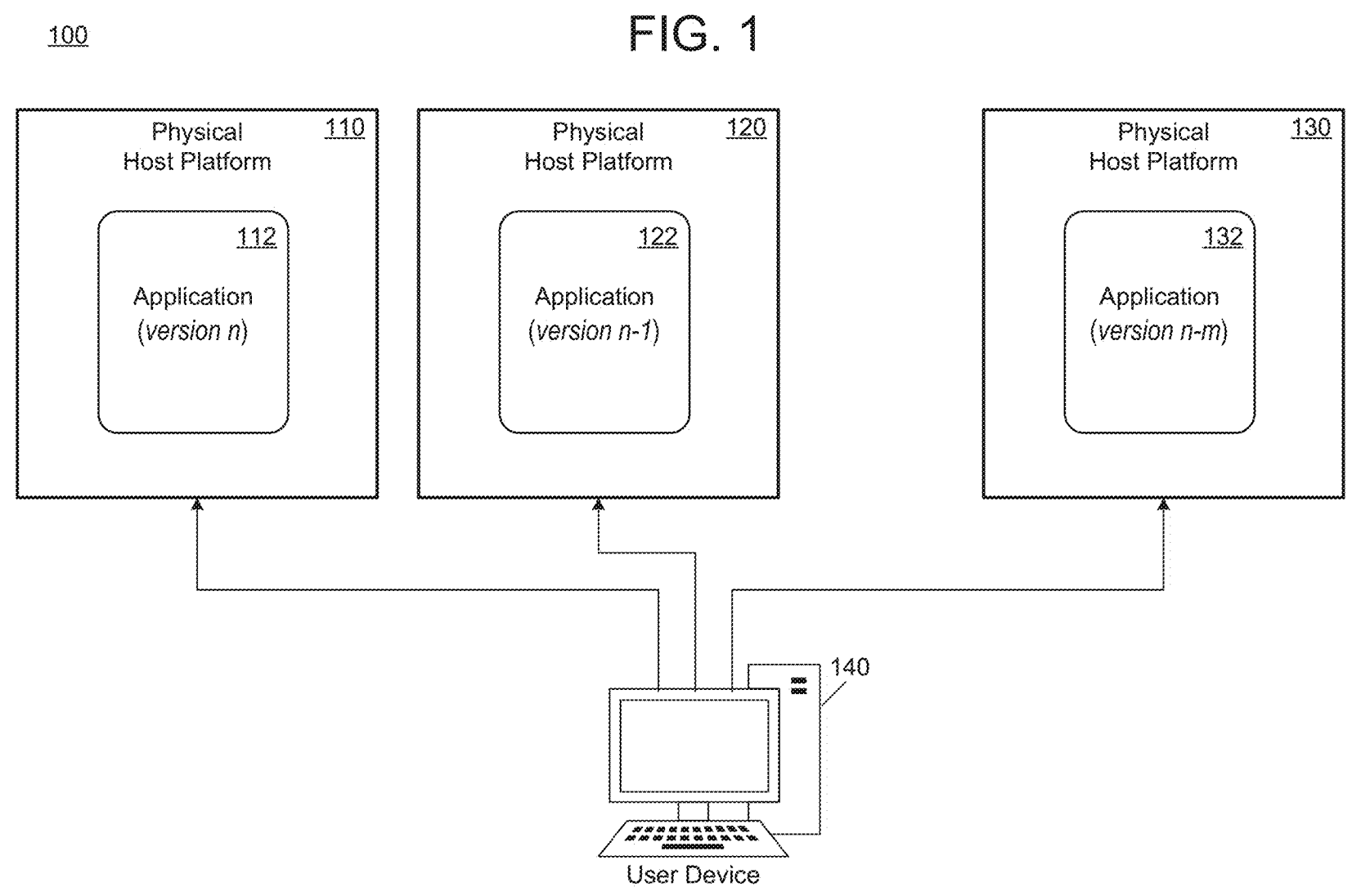

Physical Host Platform 110

Application (version n) 112

Physical Host Platform 120

Application (version n-1) 122

Physical Host Platform 130

Application (version n-m) 132

140

User Device

Figure 2A:
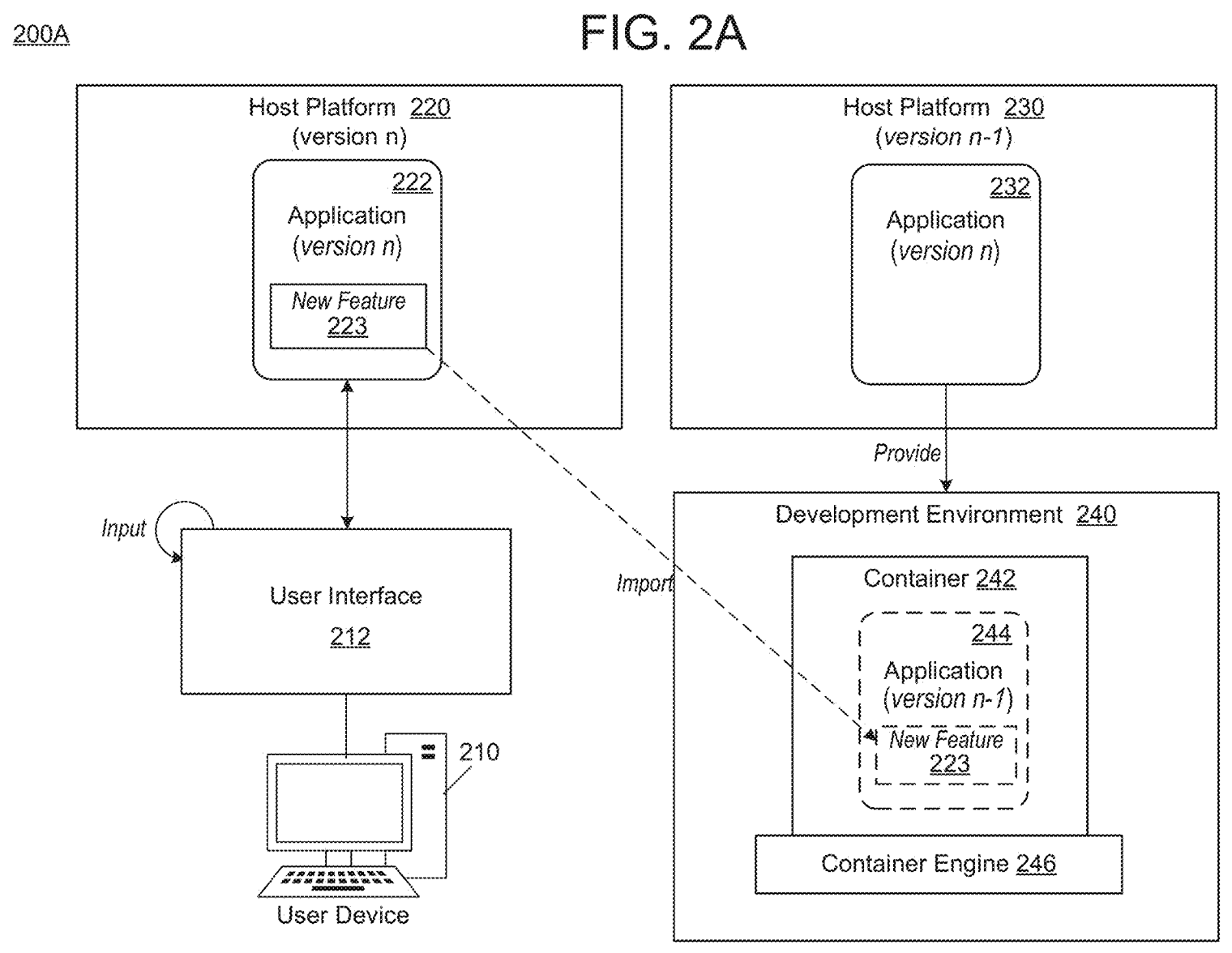

Host Platform 220
(version n)

222
Application
(version n)

New Feature
223

Host Platform 230
(version n-1)

232
Application
(version n)

Provide

Development Environment 240

Container 242

244
Application
(version n-1)

New Feature
223

Container Engine 246

Import

User Interface
212

Input

210

User Device

Figure 2C:
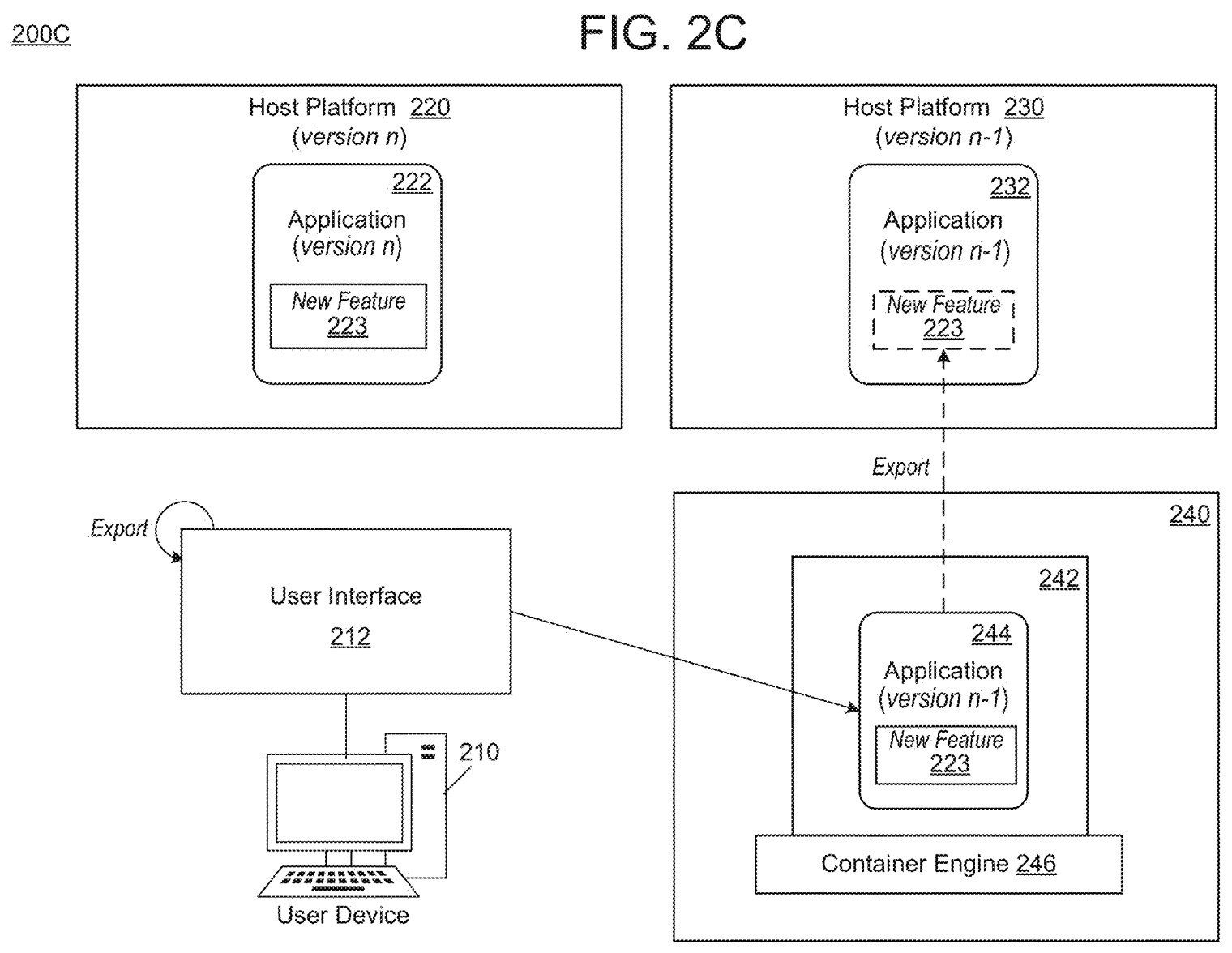

Host Platform 220
(version n)
222
Application
(version n)
New Feature
223

Host Platform 230
(version n-1)
232
Application
(version n-1)
New Feature
223

Export 240
242
244
Application
(version n-1)
New Feature
223
Container Engine 246

User Interface
212

Export

210
User Device

300
Development Environment 310
Container 320
Application 322
(version n-1)
New Feature
Container Engine 312
Host Operating System 314
Testing Software 316
Execute Tests
Test DB 318
Code Editor 330
Errors 332

400

CONTAINER-BASED SOFTWARE UPDATE FOR MULTI-VERSION SOFTWARE

BACKGROUND

Software developers often develop a software artifact natively on a host machine. For example, a developer may access an integrated development environment (IDE) for developing source code of the software artifact. The IDE may include code editors, frameworks, graphical user interfaces, and the like, for code-completion and debugging. Once the developed version is complete, the developed version is then deployed in a productive environment. This is a referred to as delivery of the software to the customer.

Over time, changes may be needed to the developed version of the software artifact for various reasons such as software updates to correct defects and bugs, increased security protocols, new functions and features, and the like. Once modified and working correctly, the software artifact is deployed to the productive environment (i.e., corrections or updates are provided to the customers, etc.) Each time the software is modified a "new" version of the software artifact is created. As a result, some users may be using different versions of the software depending on when they installed the software. Providing changes to an already released version of the software is challenging when multiple (n) versions are active because the change needs to be supplied to each of the multiple versions. This is a common situation for ABAP based systems because customers have the opportunity to decide when to upgrade.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1 is a diagram illustrating a host platform setup for hosting multiple versions of a software application in accordance with an example embodiment.

FIGS. 2A-2C are diagrams illustrating a process of updating a prior version of a software application within a containerized environment in accordance with example embodiments. For the illustration we use a "New Feature", yet this might as well be a correction.

Figure 2B:
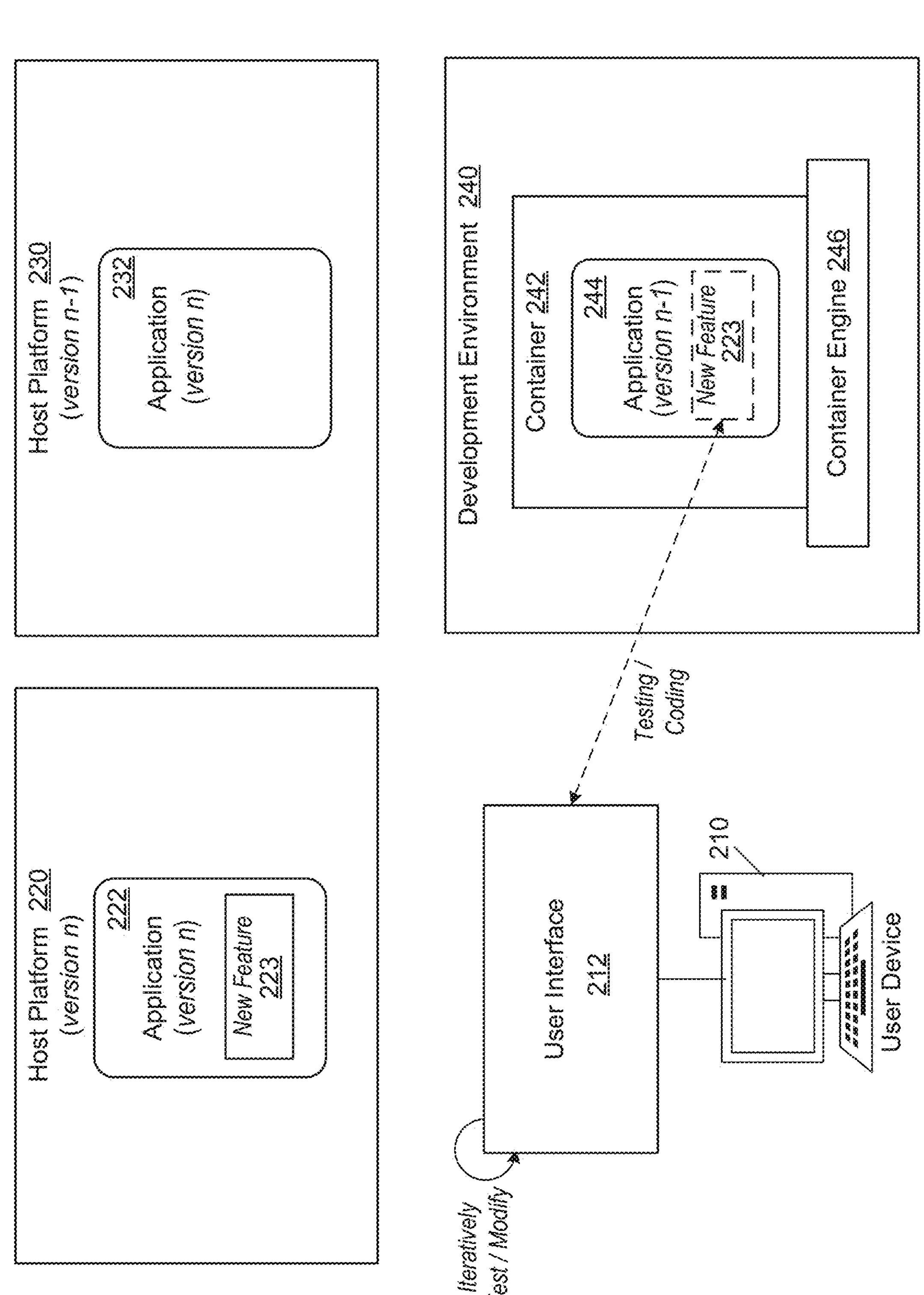

Throughout the drawings and the detailed description, unless otherwise described, the same drawing reference numerals will be understood to refer to the same elements, objects, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a software update process that can update different versions of a multiple versions software artifact using previously generated builds of the multiple versions of the software artifact. As an example, previously developed builds of the versions of the software application may be held within a containerized execution environment. Here, each version may have its own containerized deployment. Inside the container is a container image with a copy of the source code for executing the respective version of the software artifact, any necessary runtimes, system and application libraries, default settings, and the like, necessary for running the respective version of the software application.

In this example, a host platform may host a live execution environment, referred to herein as a productive environment, and a development environment where applications can be developed. For example, applications may be developed within containers in the development environment, however, embodiments are not limited thereto. The live execution environment may host different versions of a software application. Software versioning occurs as a software application continues to "evolve" with new features and functions. In some cases, features may be replaced, removed, added, or the like. Thus, each version may be different than the previous version.

Meanwhile, the development environment may be a container-based integrated development environment where a software artifact is hosted inside of a container. The development environment may include a container engine that can run multiple instances (containers) at the same time on the same operating system kernel. A software application may be developed within the container-based development environment. These builds are typically discarded to make room for new builds. However, the example embodiments leverage these older builds (which are typically discarded) and use them to upgrade a software application with different versions in an iterative process in which an update to a newest version of a software application may be integrated into a previous version of the software application using a previous build of the previous version of the software application within the containerized development environment.

According to various embodiments, an update that is successfully installed in a newest version (i.e., version n) of a software application within a productive environment may be imported into a previous version (e.g., version n−1, version n−2, version n−3, etc.) of the software application hosted within a container in the containerized development environment. In the containerized development environment, the system may execute the updated previous version of the software application to identify any problems or errors as a result of the attempted update. The problems, errors, etc. can be fixed, debugged, etc. by a user via a user interface of a code editor of the containerized development environment. When the adjustment is finished, the updated prior version of the software application may be deployed within the target physical host environment and then be released to the productive host.

FIG. 1 illustrates a computing environment 100 such as that of a large enterprise that includes a plurality of physical host platforms including a physical host platform 110, a physical host platform 120, and a physical host platform 130 which host multiple versions of a software application in accordance with an example embodiment. Referring to FIG. 1, the physical host platform 110 may host a first version 112 of the software application, the physical host platform 120 may host a second version 122 of the software application, and the physical host platform 130 may host an nth version 132 of the software application, and the like. A user device 140 can separately connect to the different physical hosts over a network, such as the Internet, and access the respective software applications hosted on the respective physical host platforms.

In the example of FIG. 1, the different versions of the software application may be the result of collaborative development updates that occur over time. Each version may include a different set of features from a previous version. For example, features may be removed, added, modified, replaced, etc. from a previous version when generating a new version. A user may not even know which version of the software artifact is on their system as the versioning may be transparent to the end user. The computing environment 100 shown in the example of FIG. 1 may correspond to an example of a computing environment in which software artifacts are developed using the Advanced Business Application Programming (ABAP) programming language, however, it should be appreciated that embodiments are not limited thereto.

FIGS. 2A-2C illustrate a process of updating prior versions of a software application within a containerized environment in accordance with example embodiments. For example, FIG. 2A illustrates a process 200A of importing a new feature 223 from a most recent version of a software application 222 in a productive environment into a previous version of the software application 232 in a productive environment. In these examples, a host platform 220 hosts a the most recent version of the software application 222 and makes it accessible to external users via a network such as the Internet. For example, a user device 210 may access the most recent version of a software application 222 hosted by the host platform 220. Here, the user device may connect to the host platform 220 via the network and view a user interface of the software application 222 via a browser on the user device, or the like.

According to various embodiments, a software update may be introduced into the most recent version of a software application 222 (i.e., version n). For example, a new feature 223 may be integrated into the most recent version of the software application 222 using any known means such as installing source code, installing a plug-in, configuring settings differently, and the like. Furthermore, the most recent version of the software application 222 with the new feature 223 included therein may be accessed by external users while it is running on the host platform 220. Furthermore, this example describes a new feature being added to the software application 222. As another example, the update may instead or may also include a deletion, a correction, or the like, of the source code of an existing feature, function, module, etc.

According to various embodiments, a user such as an administrator or developer may trigger an import of the new feature 223 from the most recent version of the software application 222 on the host platform 220 into a container 242 within a development environment 240. In this example, the container 242 includes a previous version of the software application 244 (i.e., version n−1) running within the container 242. Here, the container 242 with the previous version of the software application 244 may be generated from a container image of a previous version of the software application 232 running in a live environment on a host platform 230. Here, the host platform 230 may transfer libraries, binaries, source code, and other requirements necessary for running the previous version of the software application 232 to the container 242 for running the previous version of the software application 244.

To perform the import process, a user may enter a command on a user interface 212 via a user device 210. The user interface 212 may be part of a larger software program which manages the import process and which can trigger a transfer of the new feature 223 from the host platform 220 into the container 242 within the development environment 240. The transfer process may include the transfer and install of source code within the existing source code of the previous version of the software application 244 within the container 242. The development environment 240 also includes a container engine 246 that is capable of executing the previous version of the software application 244 within the container. For example, the container engine 246 enables execution of multiple containers at the same time via an operating system of the development environment 240.

During the import process, the host platform 220 may communicate with the development environment 240 via a transport system such as an ABAP transport system. This process may record any change when developing the new feature 223 on the host platform 220 and import them into the container 242. During this import process the source code repository is adjusted according to the changes done.

FIG. 2B illustrates a process 200B of testing the previous version of the software application 244 with the new feature 223 integrated therein while the software application 244 is executing within the container 242. Here, a user may execute commands, edit code, run the edited code, debug the code, and the like, by entering commands via the user device 210. For example, the user may access the user interface via a browser on the user interface 212 of the developer such as a personal computer, laptop, server, or the like. Furthermore, an example of the testing process that may be performed on the previous version of the software application 244 is shown and described with respect to FIG. 3.

In FIG. 2B, the user may modify the source code of the previous version of the software application 244, the source code of the new feature 223, libraries, application programming interfaces (APIs), default settings, and the like, based on commands that are entered into a code editor window on the user interface 212. When the user is satisfied with the testing, for example, when no errors are left, an instance of the previous version of the software application 244 with the new feature 223 included therein, may be exported from the container 242 into the development environment 240. Furthermore, from the development environment 240, the instance of the software application 244 with the new feature 223 may be imported/delivered into a productive environment of a host platform 230.

For example, FIG. 2C illustrates a process 200C of exporting an instance of a modified previous version of the software application 244 with the new feature 223 included therein into a productive environment within the host platform 230. Here, the instance includes the previous version of the software application 244 with the new feature 223 from FIG. 2B, which has been tested by the user until it the user is satisfied. In this example, the host platform 230 may replace the previous version of the software application 232 already running within the productive environment on the host platform 230 with the instance of the previous version of the software application 244 with the new feature 223 from FIG. 2B. The export process may be triggered by a command from the user interface 212.

The update process described in FIGS. 2A, 2B, and 2C, may be iteratively repeated with each additional version of the software artifact. For example, the process of importing the new feature 223 from the most recent version of the software application 222 within the productive environment on the host platform 220 may be repeated with a next previous version of the software application (i.e., version n−2) within a container in the development environment 240. Here, the user may test, debug, repair, fix, etc. the code of the next previous version of the software application until satisfied and trigger the export of the next previous version of the software application within the productive environment. This same process may be repeated for each additional version of the software application that is hosted in the productive environment.

Figure 3:
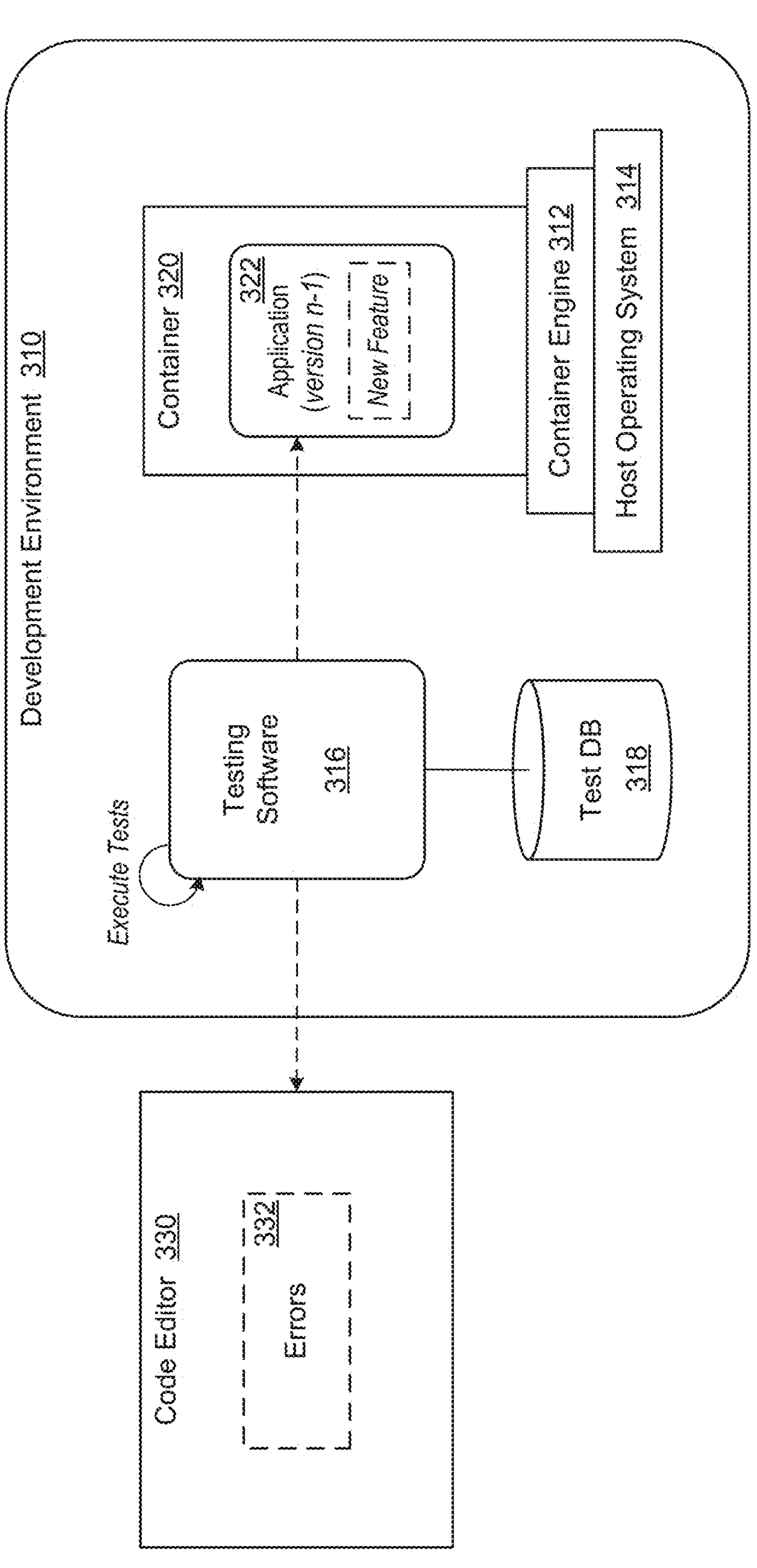
FIG. 3 is a diagram illustrating a process of testing a containerized version of an updated software application in accordance with an example embodiment.

FIG. 3 illustrates a process 300 of testing a containerized version of an updated software application in accordance with an example embodiment. Referring to FIG. 3, a user may test a software application 322 within a containerized execution environment. Here, the containerized execution environment is a development environment 310 where code changes can be made, compiled, executed, debugged, repaired, etc. For example, a user may enter commands via a code editor 330 of the development environment 310 which control a testing software 316 to run tests on the software application 322 while the software application 322 is running within a container 320 in the development environment 310. The container 320 may be run by a container engine 312 on a host operating system 314 of the development environment 310.

The testing process may perform static checks, null checks, unit tests, functional tests, and the like, based on commands entered via the user interface of the code editor 330. The results of the testing may be output by the testing software 316 on the user interface of the code editor 330. For example, the results may include one or more errors 332 that are generated by executing the test on the software application 322 within the container 320. The user may modify the source code of the software application 322 and/or any new features added to the software application via commands submitted on the user interface of the code editor 330. Here, the user may address the one or more errors 332. The tests that are run on the software application 322 may be retrieved from a testing data store 318 within the development environment 310.

Figure 4:
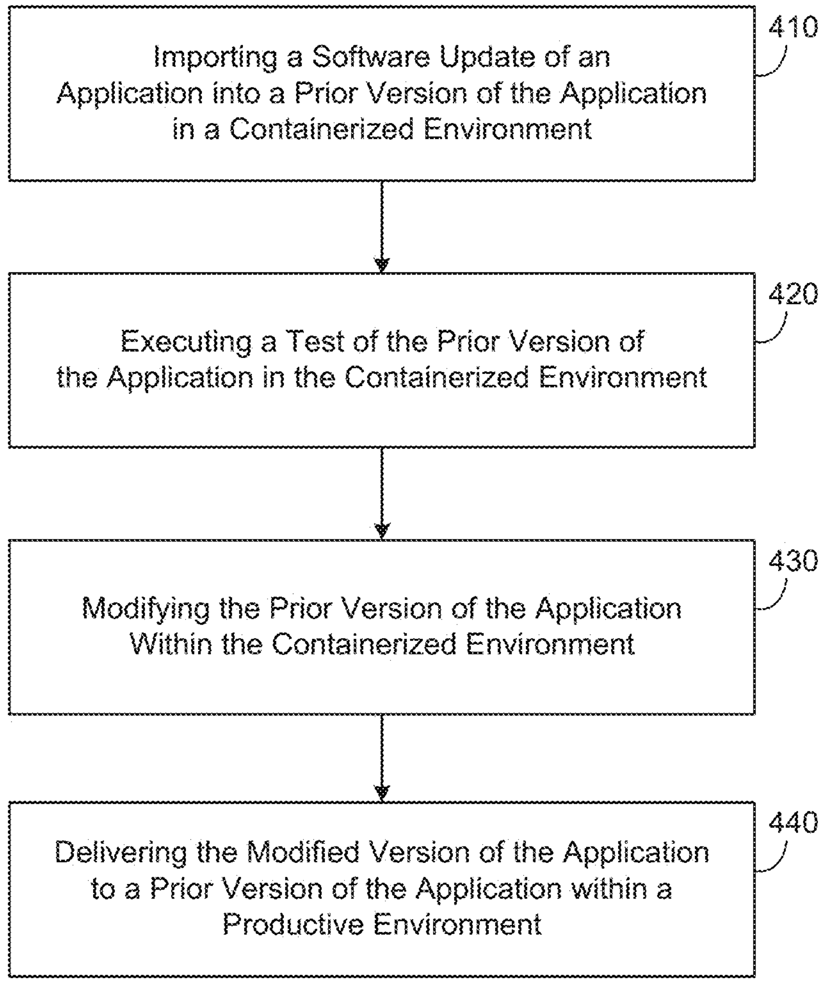
FIG. 4 is a diagram illustrating a method of updating a prior version of a software application in a containerized environment in accordance with an example embodiment.

FIG. 4 illustrates a method 400 of updating a prior version of a software application in a containerized environment in accordance with an example embodiment. For example, the method 400 may be performed by a host platform such as a server, a cloud platform, a user device, a software program, a combination thereof, and the like. Referring to FIG. 4, in 410, the method may include importing a software update of a software application into a prior version of the software application in a containerized environment. The prior version of the software application may be run as part of a container image within a container in the development environment. The container image may also include source code, runtime, system and application libraries, essential default settings, and the like.

In 420, the method may include executing a test of the prior version of the software application with the software update included therein via the containerized environment and display results of the execution of the test via a user interface. In 430, the method may include modifying the prior version of the software application with the software update included therein while the prior version of the software application with the software update included therein is within the containerized environment. In 440, the method may include delivering an instance of the modified prior version of the software application from the containerized environment to a productive environment.

In some embodiments, the receiving may include importing source code of the software update into source code of the prior version of the software application within the containerized environment prior to execution of the prior version of the software application within the containerized environment. In some embodiments, the executing the test may include identifying an error within source code of the prior version of the software application with the software update included therein based on execution of the test on the prior version of the software application with the software update included therein, and displaying information about the error on the user interface. In some embodiments, the receiving may include importing the software update into a container within the containerized environment which includes the prior version of the software application deployed therein.

In some embodiments, the executing the test may include iteratively executing one or more software tests on the prior version of the software application with the software update included therein and iteratively modifying the prior version of the software application with the software update included within the containerized environment based on commands received via the user interface. In some embodiments, the containerized environment may include an integrated development environment (IDE) where the prior version of the software application was developed previously.

In some embodiments, the method may further include importing the software update from the software application within the productive environment into a second prior version of the software application in the containerized environment, executing a test of the second prior version of the software application with the software update included therein via the containerized environment, and displaying results of the execution of the test via the user interface. In some embodiments, the method may further include modifying the second prior version of the software application with the software update included therein while the second prior version of the software application is within the containerized environment, and exporting the modified second prior version of the software application from the containerized environment to the productive environment.

Figure 5:
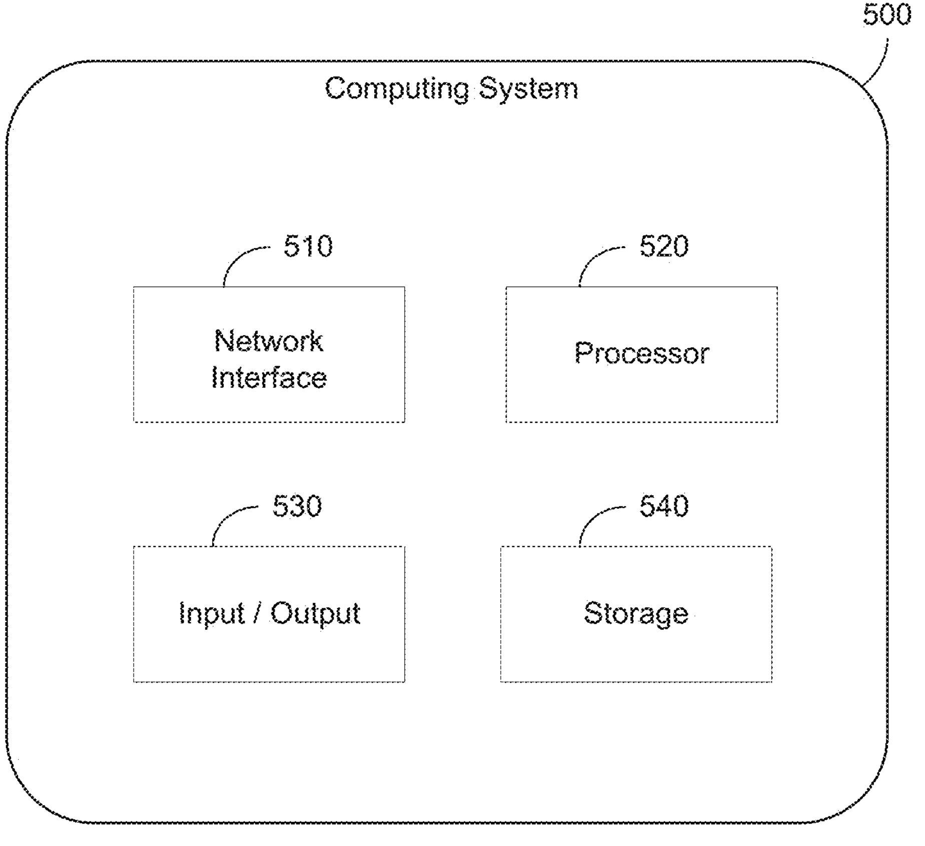
FIG. 5 is a diagram illustrating a computing system for use with any of the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage 540 such as an in-memory storage, and the like.

Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the methods described herein. According to various embodiments, the storage 540 may include a data store having a plurality of tables, records, partitions and sub-partitions. The storage 540 may be used to store database records, documents, entries, and the like.

As one example, the computing system 500 may host a productive environment where applications and other software artifacts are deployed and made accessible to external users via a network such as the Internet. For example, multiple versions of a software artifact may be created over time as new features are added, updates are made, features are removed, etc., from the software artifact. The decision of which version of the software application to execute, install, run, etc., may depend on the version that the requesting user device has installed, purchased, etc. As a result, different users may have access to different versions of the software application. Accordingly, the host platform may update each version to ensure that all users receive the software update.

The computing system 500 may also host an integrated development environment such as a container-based IDE where applications can be developed within a containerized environment. In this example, the different versions of the software application can be developed within the container-based IDE and kept in the storage 540 for subsequent use when updating the different versions of the software application. For example, the processor 520 may import a software update from a software application within the productive environment into a prior version of the software application in the containerized environment, such as an IDE. As such, the software update can be integrated into the prior version of the software application using a previous build of the prior version of the software application generated in a development environment.

The processor 520 may execute a test of the prior version of the software application with the software update included therein via the containerized environment and display results of the execution of the test via a user interface. The processor 520 may modify the prior version of the software application with the software update included while the prior version of the software application with the software update included therein is within the containerized environment. In addition, the processor 520 may export the modified prior version of the software application from the containerized environment to the productive environment.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

a processor configured to:

responsive to a current version of a software application being updated to incorporate one or more features or functions of a software update, generate a first containerized environment comprising a first prior version of the software application from a first container image of the first prior version on the software application running in a live environment on a host platform;

import the software update of the current version of the software application into the first prior version of the software application in the first containerized environment;

execute a first test of the first prior version of the software application with the software update included therein via the first containerized environment and display results of the execution of the test via a user interface;

modify the first prior version of the software application with the software update included therein while the first prior version of the software application with the software update included therein is within the first containerized environment;

deliver an instance of the modified first prior version of the software application from the first containerized environment to a productive environment wherein the modified first prior version of the software application differs from the current version of the software application; and responsive to delivering the instance of the modified first prior version of the software application to the productive environment, generate a second containerized environment comprising a second prior version of the software application from a second container image of the second prior version on the software application running in a live environment on the host platform, and repeat the import, execute, modify, and deliver processes for the second prior version of the software application.

2. The computing system of claim 1, wherein the processor is configured to import source code of the software update into source code of the first prior version of the software application within the first containerized environment prior to execution of the test.

3. The computing system of claim 1, wherein the processor is configured to identify an error within source code of the first prior version of the software application with the software update included therein based on execution of the test on the first prior version of the software application with the software update included therein, and display information about the error on the user interface.

4. The computing system of claim 1, wherein the processor is configured to import the software update into a container within the first containerized environment which includes the first prior version of the software application deployed therein.

5. The computing system of claim 1, wherein the processor is configured to iteratively execute one or more software tests on the first prior version of the software application with the software update included therein while the first prior version of the software application with the software update included therein is within the first containerized environment and iteratively modify the first prior version of the software application with the software update included within the first containerized environment based on commands received via the user interface.

6. The computing system of claim 1, wherein the first containerized environment comprises an integrated development environment (IDE) where the prior version of the software application was developed previously.

7. A method comprising:

responsive to a current version of a software application being updated to incorporate one or more features or functions of a software update, generating a first containerized environment comprising a first prior version of the software application from a first container image of the first prior version on the software application running in a live environment on a host platform;

importing the software update of the current version of the software application into the first prior version of the software application in the first containerized environment;

executing a first test of the first prior version of the software application with the software update included therein via the first containerized environment and display results of the execution of the test via a user interface;

modifying the first prior version of the software application with the software update included therein while the first prior version of the software application with the software update included therein is within the first containerized environment;

delivering an instance of the first modified prior version of the software application from the first containerized environment to a productive environment wherein the modified first prior version of the software application differs from the current version of the software application; and responsive to delivering the instance of the modified first prior version of the software application to the productive environment, generating a second containerized environment comprising a second prior version of the software application from a second container image of the second prior version on the software application running in a live environment on the host platform, and repeating the importing, executing, modifying, and delivering processes for the second prior version of the software application.

8. The method of claim 7, wherein the importing comprises importing source code of the software update into source code of the first prior version of the software application within the first containerized environment prior to execution of the test.

9. The method of claim 7, wherein the executing the test comprises identifying an error within source code of the first prior version of the software application with the software update included therein based on execution of the test on the first prior version of the software application with the software update included therein, and displaying information about the error on the user interface.

10. The method of claim 7, wherein the importing comprises importing the software update into a container within the first containerized environment which includes the first prior version of the software application deployed therein.

11. The method of claim 7, wherein the executing the test comprises iteratively executing one or more software tests on the first prior version of the software application with the software update included therein while the first prior version of the software application with the software update included therein is within the containerized environment and iteratively modifying the first prior version of the software application with the software update included within the first containerized environment based on commands received via the user interface.

12. The method of claim 7, wherein the containerized environment comprises an integrated development environment (IDE) where the first prior version of the software application was developed previously.

13. A computer-readable storage medium comprising instructions which when executed by a processor cause a computer to perform:

responsive to a current version of a software application being updated to incorporate one or more features or functions of a software update, generating a first containerized environment comprising a first prior version of the software application from a first container image of the first prior version on the software application running in a live environment on a host platform;

importing the software update of the current version of the software application into the first prior version of the software application in the first containerized environment;

executing a first test of the first prior version of the software application with the software update included therein via the first containerized environment and display results of the execution of the test via a user interface;

modifying the first prior version of the software application with the software update included therein while the first prior version of the software application with the software update included therein is within the first containerized environment;

delivering an instance of the first modified prior version of the software application from the first containerized environment to a productive environment wherein the modified first prior version of the software application differs from the current version of the software application; and responsive to delivering the instance of the modified first prior version of the software application to the productive environment, generating a second containerized environment comprising a second prior version of the software application from a second container image of the second prior version on the software application running in a live environment on the host platform, and repeating the importing, executing, modifying, and delivering processes for the second prior version of the software application.

14. The computer-readable storage medium of claim 13, wherein the importing comprises importing source code of the software update into source code of the first prior version of the software application within the containerized environment prior to execution of the test.

15. The computer-readable storage medium of claim 13, wherein the executing the test comprises identifying an error within source code of the first prior version of the software application with the software update included therein based on execution of the test on the first prior version of the software application with the software update included therein, and displaying information about the error on the user interface.

16. The computer-readable storage medium of claim 13, wherein the importing comprises importing the software update into a container within the first containerized environment which includes the first prior version of the software application deployed therein.

* * * * *